US011768998B2

(12) United States Patent
Feng

(10) Patent No.: US 11,768,998 B2
(45) Date of Patent: Sep. 26, 2023

(54) INPUT BOX INFORMATION PROCESSING METHOD AND ELECTRONIC DEVICE

(71) Applicant: VIVO MOBILE COMMUNICATION CO., LTD., Dongguan (CN)

(72) Inventor: Wei Feng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/838,145

(22) Filed: Jun. 10, 2022

(65) Prior Publication Data

US 2022/0300142 A1 Sep. 22, 2022

Related U.S. Application Data

(63) Continuation of application No. PCT/CN2020/134198, filed on Dec. 7, 2020.

(30) Foreign Application Priority Data

Dec. 12, 2019 (CN) .......................... 201911273471.9

(51) Int. Cl.
*G06F 40/166* (2020.01)
*G06F 9/54* (2006.01)
*G06F 3/0481* (2022.01)
*G06F 40/174* (2020.01)
*G06F 3/04812* (2022.01)
*G06F 3/04847* (2022.01)

(52) U.S. Cl.
CPC .......... *G06F 40/166* (2020.01); *G06F 3/0481* (2013.01); *G06F 9/543* (2013.01); *G06F 40/174* (2020.01); *G06F 3/04812* (2013.01); *G06F 3/04847* (2013.01)

(58) Field of Classification Search
CPC ...... G06F 40/166; G06F 3/0481; G06F 9/543; G06F 40/174
USPC ........................................................ 715/780
See application file for complete search history.

(56) References Cited

U.S. PATENT DOCUMENTS 8,572,474 B1 * 10/2013 Mukherjee ............ G06F 3/1208
715/224
2006/0218499 A1 * 9/2006 Matthews ............. G06F 16/313
707/E17.084

(Continued)

FOREIGN PATENT DOCUMENTS

CN 104035966 A 9/2014
CN 104281662 A 1/2015

(Continued)

OTHER PUBLICATIONS

International Search Report issued in corresponding International Application No. PCT/CN2020/134198, dated Mar. 8, 2021, 4 pages.

(Continued)

*Primary Examiner* — Asher D Kells
(74) *Attorney, Agent, or Firm* — IPX PLLC

(57) ABSTRACT

An information processing method and an electronic device are provided. The method includes receiving first information inputted by a user in a first input box, and displaying a second input box in a case that the first information does not match the first input box, where the second input box includes a part or all of the first information.

17 Claims, 9 Drawing Sheets

(56) References Cited

U.S. PATENT DOCUMENTS

| | | | | |
|---|---|---|---|---|
| 2011/0185314 A1* | 7/2011 | Sahai | ................ | G06F 9/451 |
| | | | | 715/838 |
| 2012/0290967 A1* | 11/2012 | Scott | ................ | G06F 3/0481 |
| | | | | 715/780 |
| 2013/0174081 A1* | 7/2013 | Yoon | ................ | G06F 3/0489 |
| | | | | 715/773 |
| 2015/0317293 A1* | 11/2015 | Greisson | ................ | H04L 51/04 |
| | | | | 715/256 |
| 2017/0322920 A1* | 11/2017 | Meschkat | ................ | G06Q 50/12 |
| 2019/0384805 A1* | 12/2019 | Frazer | ................ | G06F 3/04847 |
| 2020/0293164 A1* | 9/2020 | Lee | ................ | G06F 40/14 |

FOREIGN PATENT DOCUMENTS

| | | |
|---|---|---|
| CN | 104503679 A | 4/2015 |
| CN | 104657041 A | 5/2015 |
| CN | 105955637 A | 9/2016 |
| CN | 106557453 A | 4/2017 |
| CN | 109753333 A | 5/2019 |
| CN | 111090484 A | 5/2020 |

OTHER PUBLICATIONS

First Office Action issued in related Chinese Application No. 201911273471.9, dated Feb. 23, 2021, 9 pages.

* cited by examiner

INPUT BOX INFORMATION PROCESSING METHOD AND ELECTRONIC DEVICE

CROSS-REFERENCE TO RELATED APPLICATIONS

This application is a continuation of International Application No. PCT/CN2020/134198, filed on Dec. 7, 2020, which claims priority to Chinese Patent Application No. 201911273471.9, filed on Dec. 12, 2019. The entire contents of each of the above-referenced applications are expressly incorporated herein by reference.

TECHNICAL FIELD

The present disclosure relates to the field of computer technologies, and in particular, to an information processing method and an electronic device.

BACKGROUND

With the rapid development of computer technologies, functions of electronic devices become more and more powerful. The input function is a very important function, and a user can input information in an input box displayed on an electronic device. For example, during a chat in a chat application, a message can be inputted in an input box on a chat screen, and then the message can be sent to the other party. For another example, in an information search process through a browser, information to be searched for may be inputted in an input box of the browser, and then search may be performed based on the information to be searched for.

However, at present, in a process of inputting information in an input box, inputted information cannot be displayed normally, for example, because a user inputs too much information. As a result, it is inconvenient to operate (for example, view or modify) the inputted information, that is, it is inconvenient to input information.

SUMMARY

Embodiments of the present disclosure provide an information processing method and an electronic device.

According to a first aspect, an embodiment of the present disclosure provides an information processing method, applied to an electronic device. The method includes:
  receiving first information inputted by a user in a first input box; and
  displaying a second input box in a case that the first information does not match the first input box, where the second input box includes a part or all of the first information.

According to a second aspect, an embodiment of the present disclosure further provides an electronic device. The electronic device includes:
  a first information receiving module, configured to receive first information inputted by a user in a first input box; and
  a first display module, configured to display a second input box in a case that the first information does not match the first input box, where the second input box includes a part or all of the first information.

According to a third aspect, an embodiment of the present disclosure further provides an electronic device, including: a memory and a processor. The memory stores a computer program. When the computer program is executed by the processor, steps in the foregoing information processing method are implemented.

According to a fourth aspect, an embodiment of the present disclosure further provides a computer-readable storage medium, storing a computer program. When the computer program is executed by a processor, steps in the foregoing information processing method are implemented.

According to a fifth aspect, an embodiment of the present disclosure further provides a computer program product, stored in a non-volatile storage medium. The program product is executed by at least one processor to implement steps in the foregoing information processing method.

According to a sixth aspect, an embodiment of the present disclosure further provides an electronic device, configured to execute steps in the foregoing information processing method.

In the information processing method according to the embodiments of the present disclosure, the electronic device first receives the first information inputted by the user in the first input box, and then displays the second input box in the case that the first information does not match the first input box, to display a part or all of the inputted first information in the second input box. That is, in the case that the first information does not match the first input box, to avoid that the first information that does not match the first input box cannot be displayed in the first input box, the second input box may be additionally displayed, to display a part or all of the first information. Although the first information does not match the first input box and cannot be displayed in the first input box, a part or all of the first information can be displayed in the second input box. Therefore, it is convenient to view and modify the inputted information, or the like, so that it is convenient for the user to input information.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
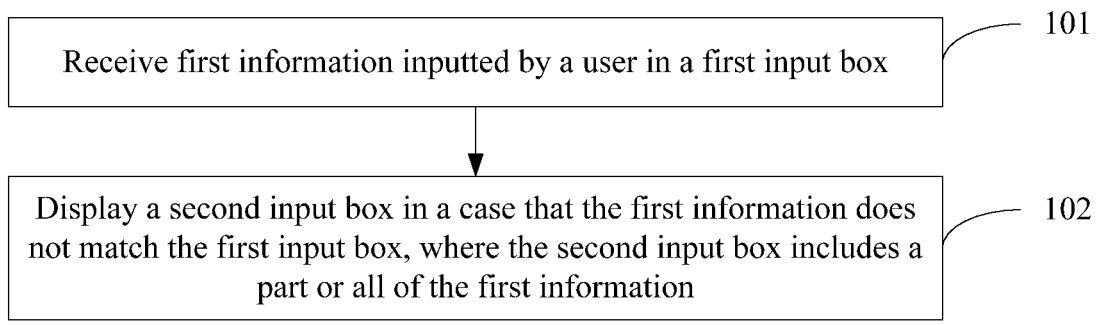
FIG. 1 is a flowchart 1 of an information processing method according to an embodiment of the present disclosure.

As shown in FIG. 1, an embodiment provides an information processing method, applied to an electronic device. The method includes:

Step 101: Receive first information inputted in a first input box.

When the first input box is displayed, a user can input information in the first input box, so that the first information inputted by the user in the first input box can be received. For example, the first information may include, but is not limited to, a text, a picture, or a video.

Step S102: Display a second input box in a case that the first information does not match the first input box, where the second input box includes a part or all of the first information.

The first information does not match the first input box, and it means that the first information cannot be displayed in the first input box. In this case, it is inconvenient to view and modify the first information or the like and it is inconvenient to input information. In this case, the second input box may be displayed, and a part or all of the first information may be displayed in the second input box.

In the information processing method according to the embodiments of this application, the user may first input information in the first input box, the first information inputted by the user in the first input box is received, and the second input box is then displayed in the case that the first information does not match the first input box, to display a part or all of the inputted first information in the second input box. That is, in the case that the first information does not match the first input box, to avoid that the first information that does not match the first input box cannot be displayed in the first input box, the second input box may be additionally displayed, to display a part or all of the first information. Although the first information does not match the first input box and cannot be displayed in the first input box, a part or all of the first information can be displayed in the second input box. Therefore, it is convenient to view and modify the inputted information, or the like, so that it is convenient for the user to input information.

In an example, if a length of the first information is less than or equal to a length of the second input box, all of the first information may be displayed in the second input box, that is, the first information may be completely displayed in the second input box. Therefore, it is convenient for the user to view or modify the first information, or the like. If the length of the first information is greater than the length of the second input box, a part of the first information can be displayed in the second input box. In this case, although the first input box does not match the first information and the first information cannot be displayed normally, a part of the first information can still be displayed in the second input box. Therefore, it is convenient to view or modify the first information, or the like.

In an embodiment, the displaying a second input box in a case that the first information does not match the first input box includes: displaying the second input box in a case that a length of the first information is greater than a length of the first input box, and/or a type of the first information does not match a first preset input type of the first input box, where a length of the second input box is greater than the length of the first input box and/or a second preset input type of the second input box matches the type of the first information.

Figure 2:
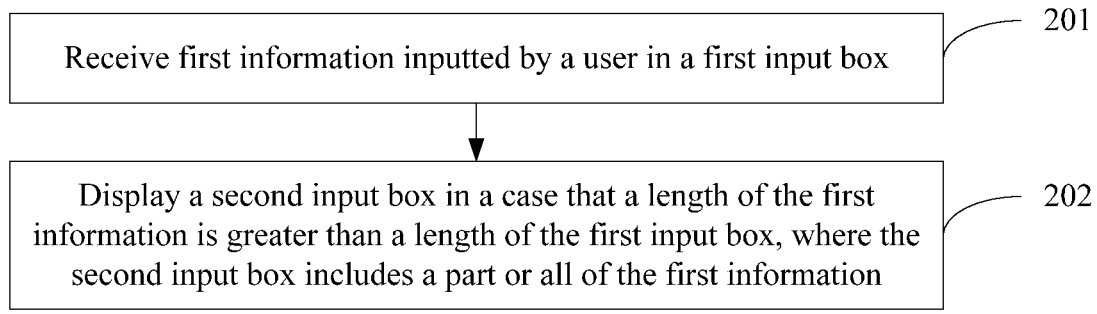
FIG. 2 is a flowchart 2 of an information processing method according to an embodiment of the present disclosure.

Matching can be performed on lengths, that is, matching is performed on the length of the first information and the length of the first input box. If the length of the first information is greater than the length of the first input box, it may mean that the first information does not match the first input box. It can be understood that the lengths do not match. When the length of the first information is greater than the length of the first input box, the second input box may be displayed, and a part or all of the first information may be displayed in the second input box. The length of the second input box is greater than the length of the first input box, so that longer information may be displayed in the second input box to enrich displayed information. That is, this embodiment may provide an information processing method, applied to an electronic device. As shown in FIG. 2, the method includes:

Step 201: Receive first information inputted by a user in a first input box.

Step 202: Display a second input box in a case that a length of the first information is greater than a length of the first input box, where the second input box includes a part or all of the first information.

Step 201 corresponds to step 101, and details are not repeated herein. The length of the first input box is fixed and limited. When the length of the first information is greater than the length of the first input box, only information having the same length as that of the first input box may be displayed, and no more information may be displayed in the first input box. As a result, the user cannot view the complete first information inputted by the user, and it is inconvenient for the user to input. Therefore, when the length of the first information is greater than the length of the first input box, the second input box may be additionally displayed. The length of the second input box is greater than the length of the first input box, so that longer information may be displayed in the second input box and more information may be displayed during the input process.

In an example, the second input box may be an input box having a variable length, which may increase as inputted information increases, so that more information may be displayed. In an example, the length of the first information may be understood as the number of characters of the first information, and the length of the first input box may be understood as the maximum number of characters that the first input box can accommodate. When the length of the first information is greater than the length of the first input box, it means that the number of characters of the first information exceeds the maximum number of characters that the first input box can accommodate. The size of the second input box may be increased, so that the maximum number of characters that the second input box can accommodate increases. In an example, the length of the second input box is greater than the length of the first input box, so that the maximum number of characters that the second input box can accommodate is greater than the maximum number of characters that the first input box can accommodate, that is, more characters may be displayed in the second input box. The user can view more characters during the input process, so that it is convenient for the user to view and modify information or the like. Besides, the positioning accuracy can be improved.

Alternatively, matching may be performed on types, that is, matching is performed on the type of the first information and the first preset input type of the first input box. If the type of the first information does not match the first preset input type of the first input box (for example, the types are different), it may mean that the first information does not match the first input box. It can be understood that the types do not match. When the type of the first information does not match the first preset input type of the first input box, the second input box may be displayed and a part or all of the first information is displayed in the second input box. The second preset input type of the second input box matches the type of the first information. In this way, the first information whose type matches that of the second input box may be displayed in the second input box. The first preset input type may be understood as an input type supported by the first input box. For example, the first preset input type may include at least one of a text type, a picture type, and a video type. In this case, the type of the first information only needs to match at least one of these types, and it is considered that the type of the first information matches the first preset input type of the first input box. If the type of the first information matches none of these type, it is considered that the type of the first information does not match the first preset input type of the first input box.

In addition, matching may also be performed on lengths and types, that is, not only matching is performed on lengths but also matching is performed on types. Only when none of the lengths and the types matches, the second input box is displayed. The length of the second input box is greater than the length of the first input box, and the second preset input type of the second input box matches the type of the first information. In this case, this not only can enrich displayed information, but also can avoid the problem of inability to display due to type mismatch. Therefore, it is convenient for the user to view or modify information.

In this embodiment, when the length of the first information is greater than the length of the first input box, and/or the type of the first information does not match the first preset input type of the first input box, the second input box may be additionally displayed, to display a part or all of the first information. The length of the first information exceeds the length of the first input box and no more information may be viewed in the first input box, and/or the type of the first information does not match the first preset input type of the first input box and information whose type does not match that of the first input box cannot be displayed in the first input box, which results in that the user cannot view more information. However, more information may be displayed in the second input box. It is convenient for the user to view and modify the inputted information or the like and it is convenient for the user to input information.

In an embodiment, after displaying the second input box, the method includes: receiving second information inputted by the user in the second input box; and copying the second information into the first input box.

The second input box is displayed and includes a part or all of the first information. The user may input in the displayed second input box, for example, perform input based on a part or all of the displayed first information, such as perform input of information addition or deletion. In this way, the second information inputted by the user in the second input box may be received, and then may be copied into the first input box to overwrite the first information, to implement information synchronization between the first input box and the second input box.

In an embodiment, the receiving second information inputted by the user in the second input box includes: displaying a cursor in the second input box; and receiving an editing input performed by the user in the second input box, and editing information in a position of the cursor of the second input box according to the editing input, to obtain the second information.

During inputting, there is always a cursor that displays a position in which you will perform input. In this application, after the second input box is displayed, the cursor may be displayed in the second input box. For example, the cursor may be displayed at the end of a part or all of the first information displayed in the second input box. The user may also adjust the display position of the cursor in the second input box, and may input in the position of the cursor in the second input box. That is, the user may perform editing input in the second input box, and information in the position of the cursor of the second input box may be edited according to the editing input, to obtain the second information. It can be understood that the second information may be information obtained after updating a part or all of the first information based on the editing input. For example, the second information may include information that is edited through the editing input and remaining information of a part or all of the first information (that is, is not edited). For example, the first information is "the weather is really nice today", all of which is displayed in the second input box, and the cursor is at the end of the first information in the second input box, that is, behind the last character. The user edits to add ", let's go for a walk!". In this way, the second information obtained is "the weather is really nice today, let's go for a walk". For another example, the cursor is between characters "really" and "nice" in the first information in the second input box, and the user edits to add information of a character "not". In this case, the second information obtained is "the weather is really not nice today".

Subsequently, the second information may be copied into the first input box to overwrite the first information, that is, the first information inputted in the first input box is updated to the second information. In this way, the first information may be edited and overwritten in the second input box to implement information update.

In an embodiment, the second input box is displayed on a first screen including the first input box, that is, the second input box and the first input box are displayed on the same first screen. The user may view the first input box and the second input box at the same time. For example, the first screen may be a web screen or a chat screen, and the first input box and the second input box may be displayed on the first screen at intervals. That is, in this embodiment, the second input box is displayed without screen switching, to help to improve the efficiency of displaying the second input box.

In another embodiment, the displaying a second input box includes: displaying an application identifier of at least one text editing application; receiving a first input for an application identifier of a target application of the application identifier of the at least one text editing application; and in response to the first input, displaying an screen of the target application corresponding to the application identifier of the target application, where the screen of the target application includes the second input box.

The application identifier is information used to uniquely represent the application. After the application identifier is selected, the application may be selected or determined. In this embodiment, the second input box is displayed on the screen of the text editing application, that is, the second input box is a part of the screen of the application. The at least one text editing application may include memo application, word document application, and the like. For example, when the user selects memo application, a memo application screen may be displayed, and the memo application screen provides an editing area for text editing, that is, the second input box. If the user selects word document application, a word document application screen is displayed, and the word document application screen provides an editing area for text editing, that is, the second input box whose size may increase as edited information increases. The text editing application may provide a larger editing area, and the user can view more information, which helps the user to view or modify information or the like, thereby facilitating input.

In an embodiment, the displaying a cursor in the second input box includes: moving a cursor in the first input box to the second input box.

In this embodiment, after copying the second information into the first input box, the method further includes: displaying the cursor in a first position in the first input box, where the cursor is displayed in the first position in the first input box before the cursor in the first input box is moved to the second input box.

That is, in this embodiment, after the second input box is displayed, the cursor in the first input box may be moved to the second input box, thereby switching the input from the first input box to the second input box. In this case, the input of the first input box is locked and information cannot be inputted. The input cursor is moved to the second input box, and subsequently information may continue to be inputted in the second input box. Moreover, in this embodiment, after the second information is copied into the first input box, the cursor still needs to be displayed in the first position in the first input box in which the cursor is displayed before the cursor in the first input box is moved to the second input box, so that the user may continue editing unfinished information in the first input box. For example, the first position in the first input box in which the cursor is displayed before the cursor is moved to the second input box is a position between the first character and the second character in the first input box. Even if the first character and/or the second character is modified in the second input box, the position remains unchanged. After the second input box is closed, the cursor is still displayed in the original position.

In an example, after the second information is copied into the first input box, the second input box may be closed. The displaying the cursor in the first position in the first input box may be performed after the second input box is closed. Since the cursor is still displayed in the first input box subsequently, the second input box is closed, to reduce waste of resources.

In an embodiment, the screen of the target application further includes a first control and a second control.

The copying the second information into the first input box includes: copying the second information into the first input box in a case that a second input for the first control is received.

Alternatively, the method further includes: closing the target application in a case that a third input for the second control is received.

That is, when the first control is operated, the process of copying the second information into the first input box is triggered, to meet the requirement of the user. If the second control is operated, the application is closed directly.

In an example, after the second information is copied into the first input box, the target application may be closed, to close the second input box. That is, the screen of the target application provides two manners to close the second input box. In one manner, the first control is clicked on, the second information needs to be copied into the first input box to overwrite the first information, and the target application is closed to close the second input box. In the other manner, the second control is clicked on to directly close the target application to close the second input box, the second information does not need to be copied, and information in the first input box is still the original first information. In this way, different operations are provided for the user, to meet different requirements of the user.

In an embodiment, if the second input box is displayed on the first screen including the first input box, the copying the second information to the first input box may include: in a case that an input for an area other than the second input box on the first screen is received, copying the second information into the first input box to overwrite the first information. That is, input, for example, clicking, may be performed in any area other than the second input box on the first screen, to copy the second information into the first input box to overwrite the first information. Therefore, it is convenient for the user to operate. Besides, after the second information is copied into the first input box, the second input box is closed.

In an embodiment, when the first information does not match the first input box, the displaying the second input box includes: when the first information does not match the first input box, displaying a first icon; and when a fourth input for the first icon is received, displaying the second input box.

For example, when the length of the first information does not match the length of the first input box, that is, when the length of the first information is greater than the length of the first input box, the first icon is displayed first to prompt the user that the second input box may be displayed. If the user performs the fourth input on the first icon, such as clicking, it means that the second input box needs to be displayed. In response to the fourth input, the second input box may be displayed. The second input box may be displayed on the first screen, or may be the second input box on the screen of the target application.

In an embodiment, after copying the second information into the first input box, the method may further include:

displaying tail information in the first input box, where the tail information is continuous information in the second information, the last character of the tail information is the last character of the second information, the first character of the tail information is a target character of the second information, and a length from the target character to the last character in the second information is less than or equal to the length of the first input box. That is, the last information that is of the second information and whose length is not greater than the length of the first input box is displayed in the first input box, so that the user can view or the like. For example, if the length of the first input box is 10 and can accommodate up to 10 characters and the second information has 20 characters, the last 10 characters in the second information may be displayed in the first input box.

A process of the method is specifically described below with a specific embodiment.

First, for example, the user searches in a browser webpage, the first input box is a search bar, the second input box is displayed in the webpage including the first input box, the second input box is an auxiliary editing bar, and matching is performed on lengths.

Figure 3:
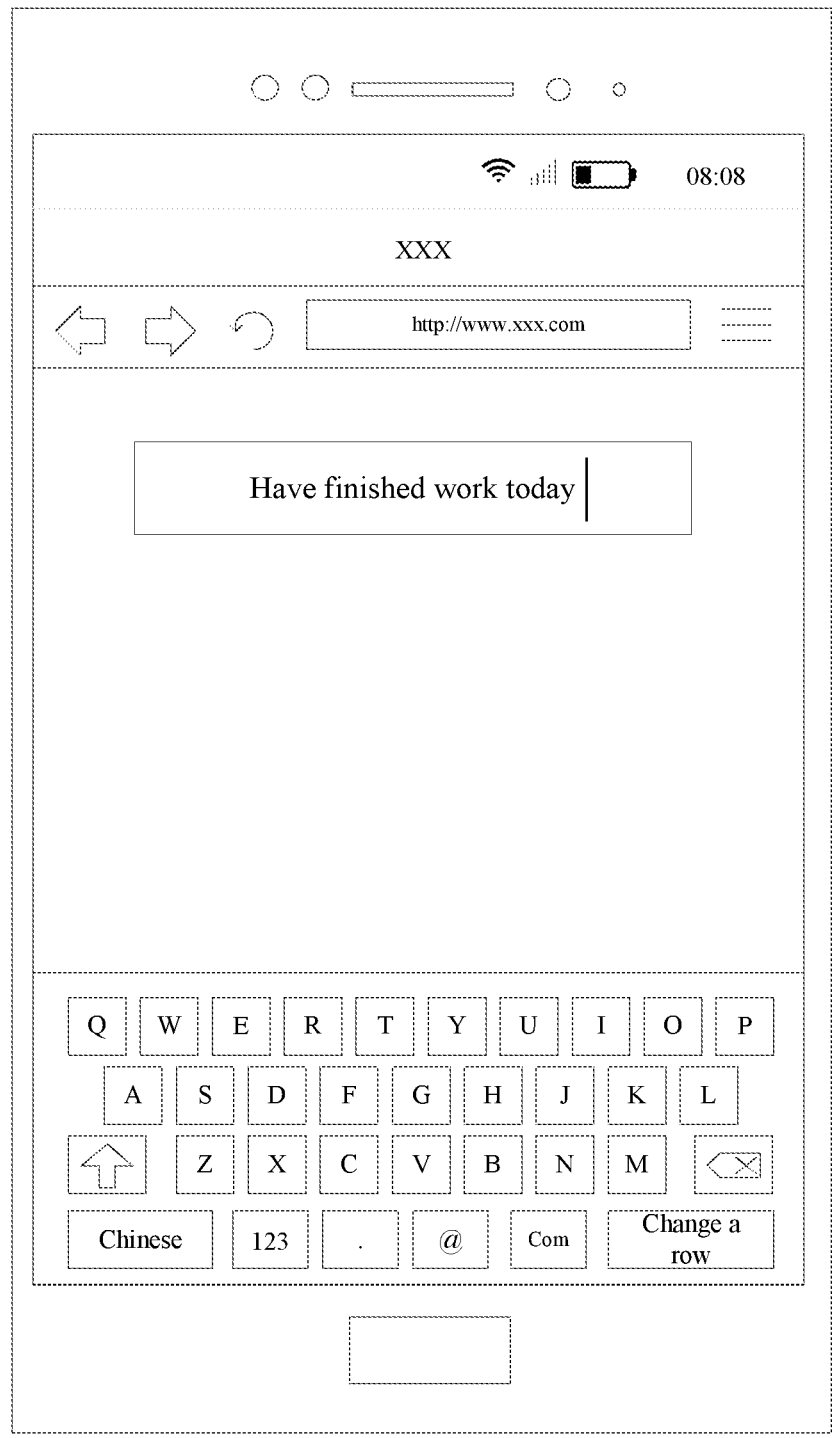
FIG. 3 is a diagram 1 that displays a screen of an electronic device according to an embodiment of the present disclosure.
Figure 4:
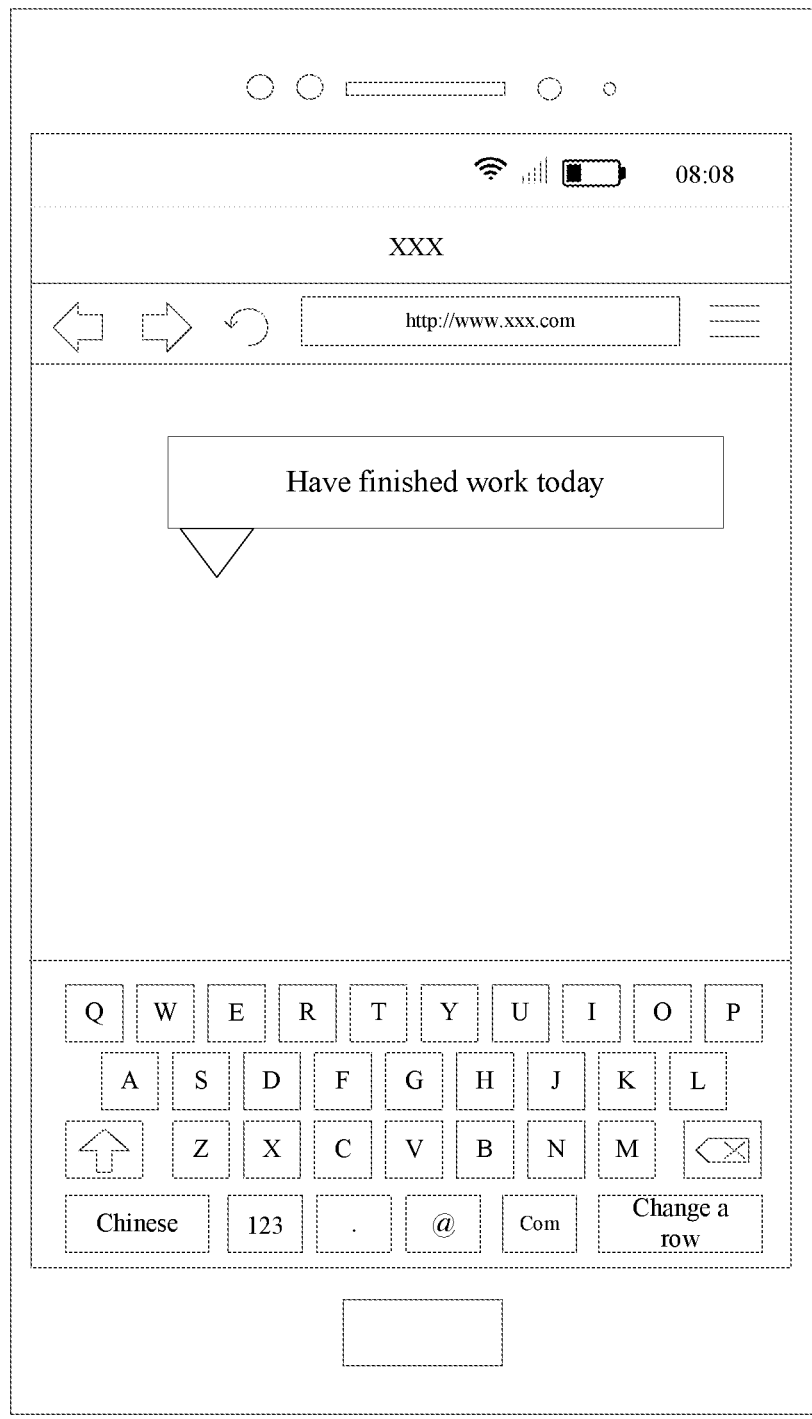
FIG. 4 is a diagram 2 that displays a screen of an electronic device according to an embodiment of the present disclosure.

As shown in FIG. 3, the search bar is displayed in the webpage. When the user edits information in the search bar, it is monitored whether a length of the information edited by the user is greater than a display length of the search bar (that is, the length of the first input box). If not, the normal editing mode is maintained. If yes, the first icon, such as a triangle icon shown in FIG. 4, is displayed in an area between the first input box and a keyboard. The cursor is located at the end of the search bar. In this embodiment, the first information is "I have finished work today" and exceeds the length (e.g., 4) of the search bar. Therefore, the character "I" cannot be displayed in the search bar, and "have finished work today" is displayed in the search bar.

Figure 5:
FIG. 5 is a diagram 3 that displays a screen of an electronic device according to an embodiment of the present disclosure.

It is monitored whether the user clicks on the triangle icon. If not, the normal editing mode is maintained. If yes, the search bar is locked, so that no input may be performed in the search bar, the position of the cursor in the search bar is determined, and an auxiliary editing bar is displayed in the area between the first icon and the keyboard, so that the user performs an editing operation. All of the first information is displayed in the auxiliary editing bar, and the user may view the complete first information in the auxiliary editing bar and may modify or view information by positioning to-be-modified or to-be-viewed information, as shown in FIG. 5. In FIG. 5, the cursor is located between "have" and "finished". The user may add one or more characters between the characters "have" and "finished" displayed in the auxiliary editing bar, to modify the first information to obtain the second information. For example, if "entirely" is added between "have" and "finished", the second information is "I have entirely finished work today".

Figure 6:
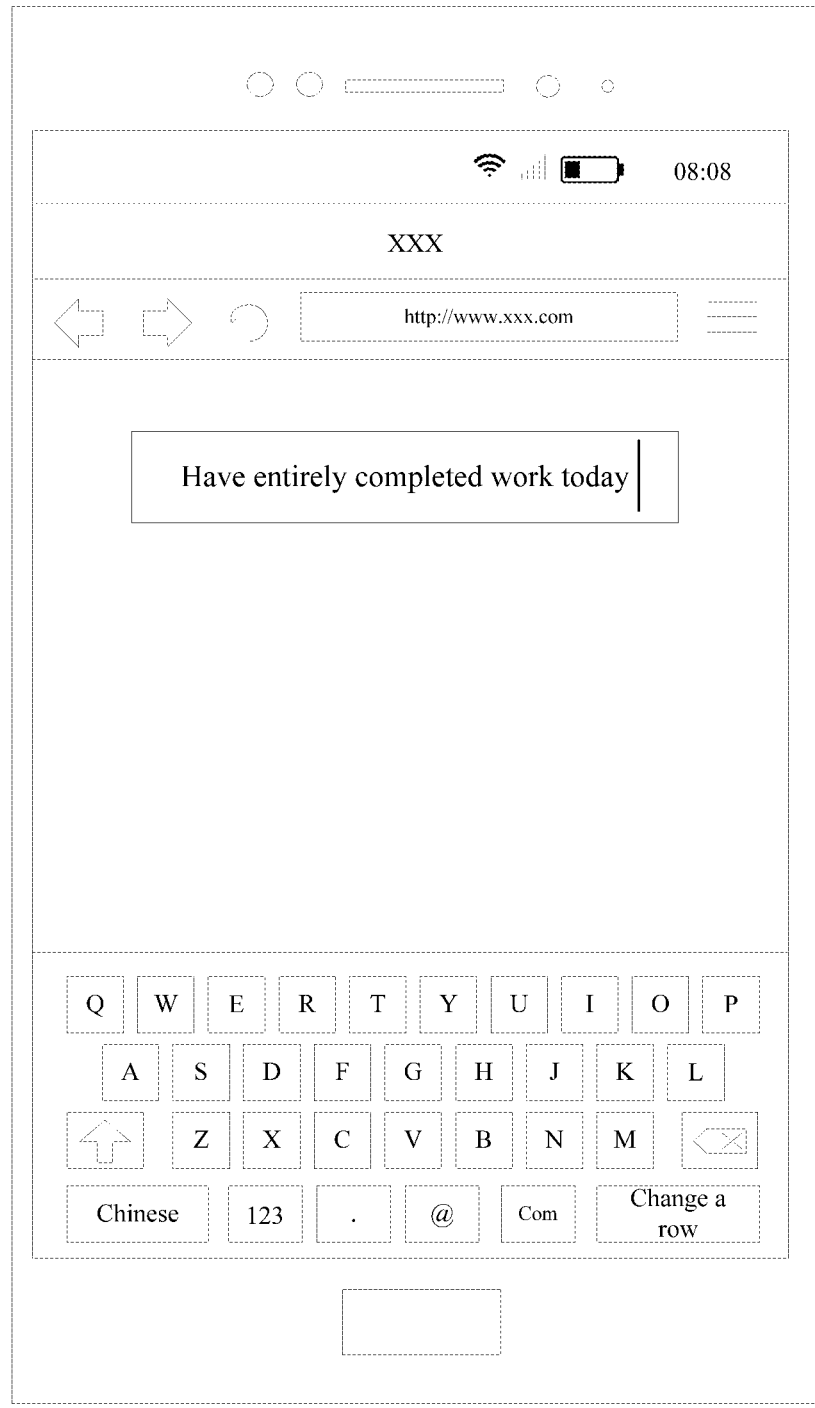
FIG. 6 is a diagram 4 that displays a screen of an electronic device according to an embodiment of the present disclosure.

It is monitored whether the user clicks on an area other than the auxiliary editing bar. If yes, the second information determined after editing in the auxiliary editing bar is copied into the search bar, and the last information of the second information may be displayed in the search bar. A length of the last information is less than or equal to the length of the search bar, for example, "have entirely finished work" is displayed. Besides, the auxiliary editing bar is closed, and the cursor is still displayed in the initial position of the search bar, that is, the end described above, to enter the normal editing mode. That is, the search bar is unlocked and information may be inputted, as shown in FIG. 6.

Then, for example, the user searches in a browser webpage, the first input box is a search bar, the second input box is displayed on the screen of the target application and is an editing area on the screen of the target application, and matching is performed on lengths.

As shown in FIG. 3, the search bar is displayed in the webpage. When the user edits information in the search bar, it is monitored whether a length of the information edited by the user is greater than a display length of the search bar (that is, the length of the first input box). If not, the normal editing mode is maintained. If yes, the first icon, such as a triangle icon shown in FIG. 4, is displayed in an area between the first input box and a keyboard. The cursor is located at the end of the search bar. In this embodiment, the first information is "I have finished work today" and exceeds the length 4 of the search bar. Therefore, the character "I" cannot be displayed in the search bar, and "have finished work today" is displayed in the search bar.

Figure 7:
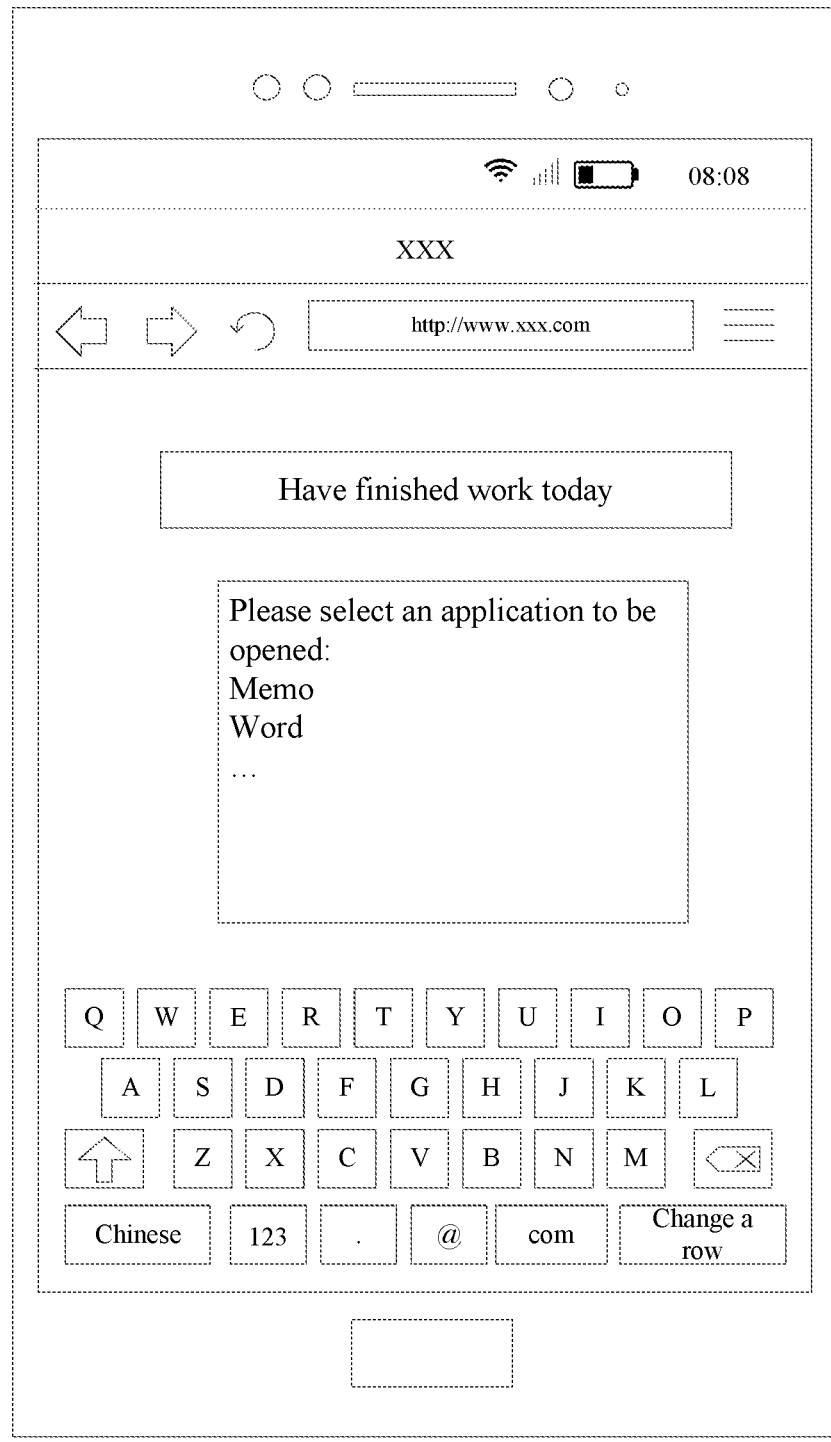
FIG. 7 is a diagram 5 that displays a screen of an electronic device according to an embodiment of the present disclosure.
Figure 8:
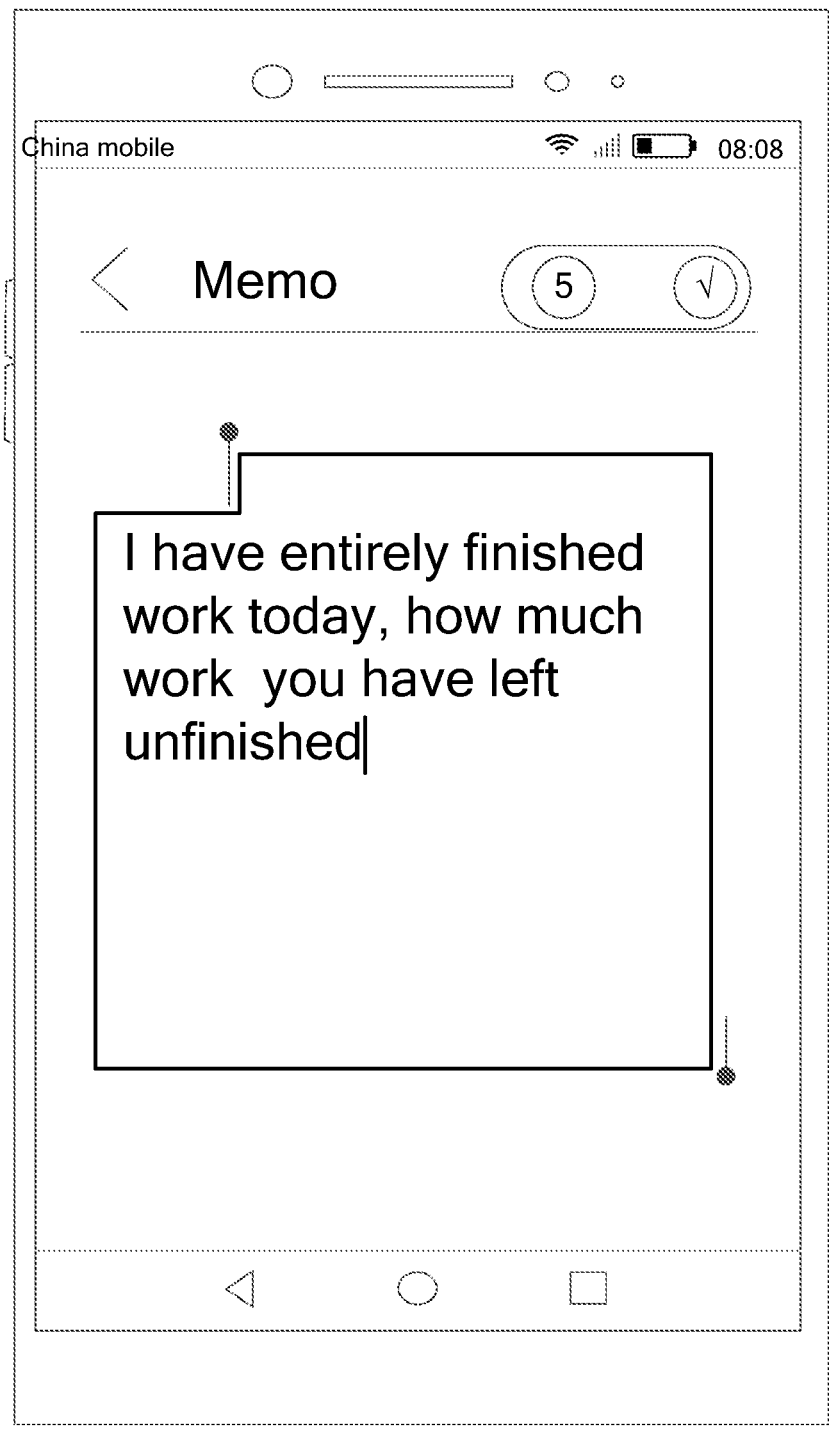
FIG. 8 is a diagram 6 that displays a screen of an electronic device according to an embodiment of the present disclosure.

It is monitored whether the user clicks on the triangle icon. If not, the normal editing mode is maintained. If yes, the search bar is locked, so that no input may be performed in the search bar, the position of the cursor in the search bar is determined, and a memo application and a word document application are displayed for the user to select, as shown in FIG. 7. For example, when the user selects memo application, a memo screen application is displayed. The user may input information in an editing area of the memo application screen, and all of the first information inputted in the search bar may be displayed in the editing area of the memo application screen. The user may view the complete first information in the editing area of the memo application screen and may modify or view information by positioning to-be-modified or to-be-viewed information, as shown in FIG. 8. In FIG. 8, after the cursor is displayed behind the last character, the user may add one or more characters behind "today" to modify the first information to obtain the second information, for example, add ", how much work you have left unfinished" behind "today". In this case, the second information is "I have entirely finished work today, how much work you have left unfinished".

A first control (a ✓ control in FIG. 8) and a second control (a x control in FIG. 8) are provided on the memo application screen. If the user clicks on the first control, the second information is copied into the search bar to overwrite the first information, and the memo application is closed and the second input box is closed accordingly. If the user clicks on the second control, the memo application is directly closed and the second input box is closed accordingly.

Figure 9:
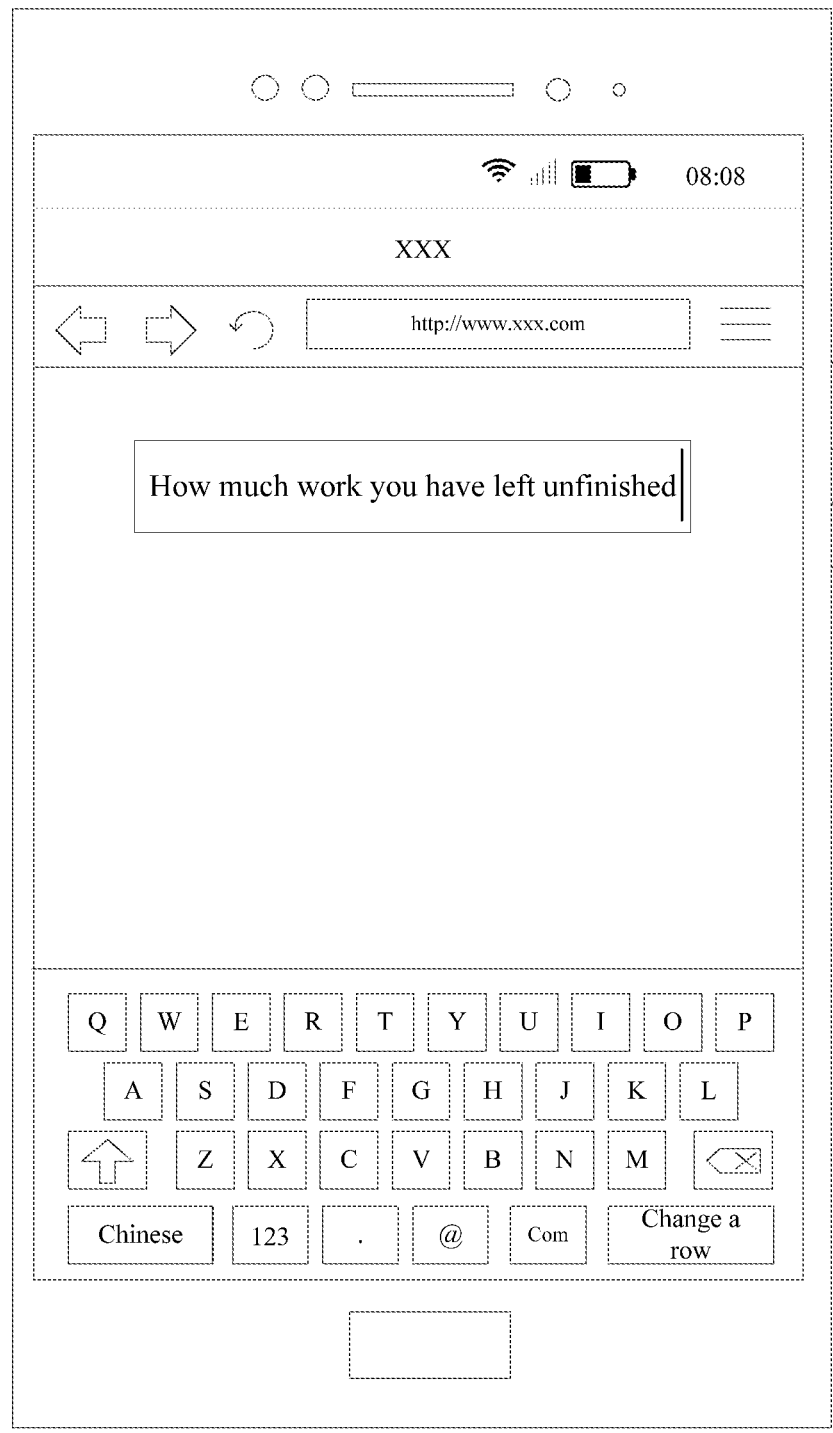
FIG. 9 is a diagram 7 that displays a screen of an electronic device according to an embodiment of the present disclosure.

After the target application is closed, the second input box is closed accordingly, and the cursor may be still displayed in the initial position of the search bar, that is, the end described above, to enter the normal editing mode. That is, the search bar is unlocked and information may be inputted, as shown in FIG. 9. "how much work you have left unfinished" is displayed in the search bar.

In the embodiments of the present application, operations such as addition, deletion, search, and modification performed on the first information in the first input box may be performed in the second input box, to overcome the defect of the current technology that it is difficult to view complete information and inconvenient to perform operations such as addition, deletion, search, and modification. Besides, after editing is performed in the second input box, the initial position of the cursor in the first input box may be restored. Therefore, it is convenient for the user to continue editing an unfinished text.

Figure 10:
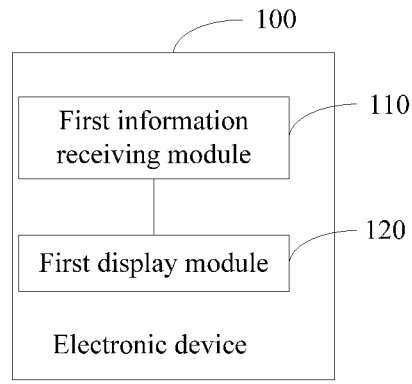
FIG. 10 is a schematic diagram 1 of an electronic device according to an embodiment of the present disclosure.

As shown in FIG. 10, an embodiment further provides an electronic device 1100, including:
a first information receiving module 110, configured to receive first information inputted by a user in a first input box; and
a first display module 120, configured to display a second input box in a case that the first information does not match the first input box, where the second input box includes a part or all of the first information.

In an embodiment, the first display module is configured to display the second input box in a case that a length of the first information is greater than a length of the first input box, and/or a type of the first information does not match a first preset input type of the first input box, where a length of the second input box is greater than the length of the first input box and/or a second preset input type of the second input box matches the type of the first information.

In an embodiment, the electronic device further includes:
- a second information receiving module, configured to receive second information inputted by the user in the second input box; and
- a copying module, configured to copy the second information into the first input box.

In an embodiment, the second information receiving module includes:
- a second display module, configured to display a cursor in the second input box; and
- a second information obtaining module, configured to receive an editing input performed by the user in the second input box, and edit information in a position of the cursor of the second input box according to the editing input, to obtain the second information.

In an embodiment, the second input box is displayed on a first screen including the first input box;

or the first display module includes:
- an application display module, configured to display an application identifier of at least one text editing application;
- a first receiving module, configured to receive a first input for a target application identifier of the application identifier of the at least one text editing application; and
- a screen display module, configured to: in response to the first input, display an screen of a target application corresponding to the target application identifier, where the screen of the target application includes the second input box.

In an embodiment, the second display module includes:
a moving module, configured to move a cursor in the first input box to the second input box; and
the electronic device further includes:
a third display module, configured to: after the copying module copies the second information into the first input box, display the cursor in a first position in the first input box after the copying module copies the second information into the first input box, where the cursor is displayed in the first position in the first input box before the cursor in the first input box is moved to the second input box.

In an embodiment, the screen of the target application further includes a first control and a second control; and the copying module is configured to copy the second information into the first input box in a case that a second input for the first control is received.

Alternatively, the electronic device further includes:
a closing module, configured to close the target application in a case that a third input for the second control is received.

In an embodiment, the closing module may be further configured to close the target application after the second information is copied into the first input box.

The technical features of the electronic device provided in the embodiments of the present disclosure correspond to the technical features of the foregoing information processing method, and each process of the information processing method may be performed by the electronic device and the same effect can be achieved. To avoid repetition, details are not repeated herein.

Figure 11:
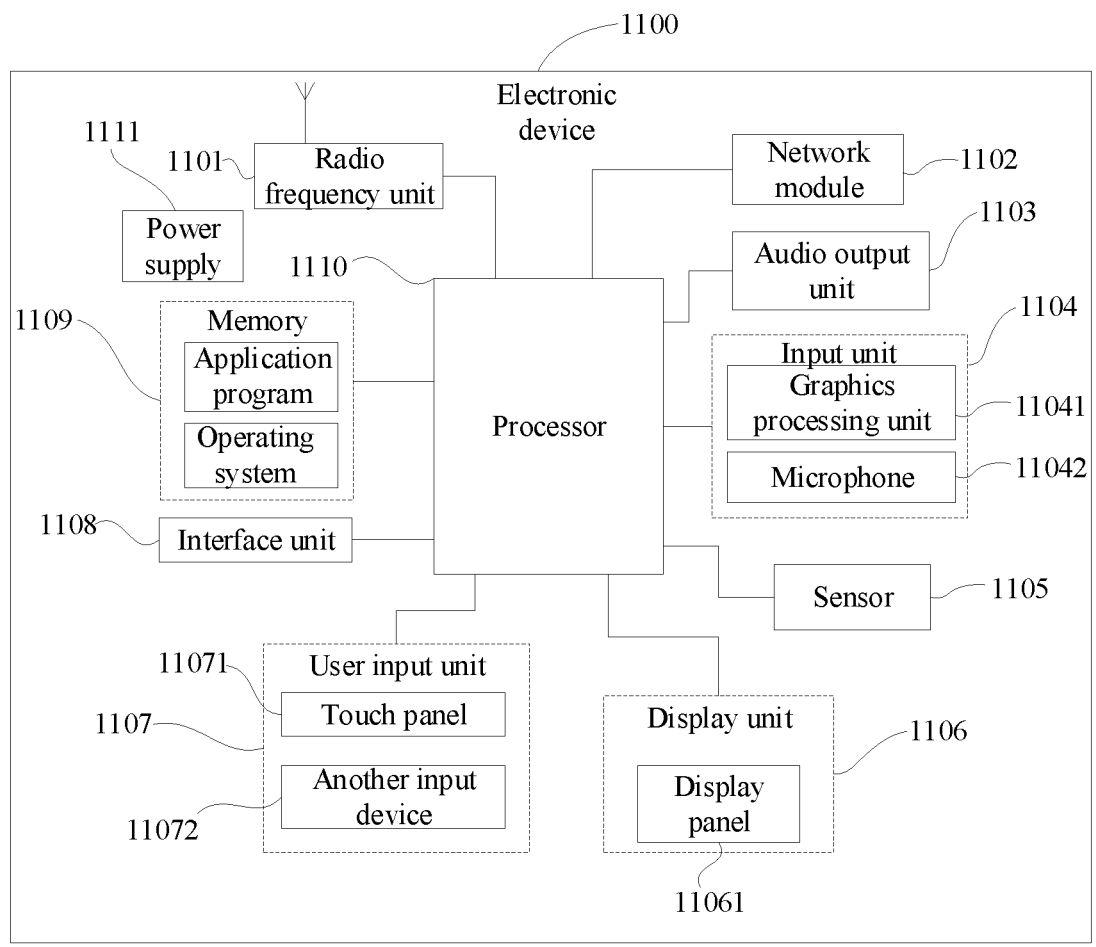
FIG. 11 is a schematic structural diagram of hardware of an electronic device according to an embodiment of the present disclosure.

FIG. 11 is a schematic structural diagram of hardware of an electronic device implementing the embodiments of the present disclosure. The electronic device 1100 includes but is not limited to: a radio frequency unit 1101, a network module 1102, an audio output unit 1103, an input unit 1104, a sensor 1105, a display unit 1106, a user input unit 1107, a screen unit 1108, a memory 1109, a processor 1110, a power supply 1111, and other components. A person skilled in the art may understand that the structure of the electronic device shown in FIG. 11 constitutes no limitation on the electronic device. The electronic device may include more or fewer components than those shown in the figure, or a combination of some components, or an arrangement of different components. In this embodiment of the present disclosure, the electronic device includes but is not limited to a mobile phone, a tablet computer, a notebook computer, a palmtop computer, an in-vehicle terminal, a wearable device, a pedometer, and the like.

The user input unit 1107 is configured to receive first information inputted by a user in a first input box, and the display unit 1106 is configured to display a second input box in a case that the first information does not match the first input box, where the second input box includes a part or all of the first information.

First, the user may input information in the first input box, and the electronic device first receives the first information inputted by the user in the first input box, and then displays the second input box in the case that the first information does not match the first input box, to display a part or all of the inputted first information in the second input box. That is, in the case that the first information does not match the first input box, to avoid that the first information that does not match the first input box cannot be displayed in the first input box, the second input box may be additionally displayed, to display a part or all of the first information. Although the first information does not match the first input box and cannot be displayed in the first input box, a part or all of the first information may be displayed in the second input box. Therefore, it is convenient to view and modify the inputted information, or the like, so that it is convenient for the user to input information.

It should be understood that, in this embodiment of the present disclosure, the radio frequency unit 1101 may be configured to receive and send information or receive and send a signal in a call process. Specifically, after downlink data from a base station is received, the processor 1110 processes the downlink data. In addition, uplink data is sent to the base station. Generally, the radio frequency unit 1101 includes, but is not limited to, an antenna, at least one amplifier, a transceiver, a coupler, a low noise amplifier, a duplexer, and the like. In addition, the radio frequency unit 1101 may also communicate with a network and other devices through a wireless communication system.

The electronic device provides users with wireless broadband Internet access through the network module 1102, for example, helps users receive and send e-mails, browse web pages, and access streaming media.

The audio output unit 1103 may convert audio data received by the radio frequency unit 1101 or the network module 1102 or stored in the memory 1109 into an audio signal and output the audio signal as a sound. Moreover, the audio output unit 1103 may further provide audio output related to a specific function performed the electronic device 1100 (for example, call signal receiving sound and message receiving sound). The audio output unit 1103 includes a speaker, a buzzer, a telephone receiver, and the like.

The input unit 1104 is configured to receive audio or radio frequency signals. The input unit 1104 may include a Graphics Processing Unit (GPU) 11041 and a microphone 11042, and the graphics processing unit 11041 processes image data of a still picture or video obtained by an image capture apparatus (such as a camera) in a video capture mode or an image capture mode. A processed image frame may be displayed on the display unit 1106. The image frame processed by the graphics processing unit 11041 may be stored in the memory 1109 (or another storage medium) or sent by using the radio frequency unit 1101 or the network module 1102. The microphone 11042 may receive sound and may process such sound into audio data. The audio data obtained through processing may be converted, in a telephone call mode, into a format that may be sent to a mobile communication base station via the radio frequency unit 1101 for output.

The electronic device 1100 further includes at least one sensor 1105, for example, a light sensor, a motor sensor, and another sensor. Specifically, the light sensor includes an ambient light sensor and a proximity sensor. The ambient light sensor may adjust brightness of a display panel 11061 according to ambient light brightness. The proximity sensor may switch off the display panel 11061 and/or backlight when the electronic device 1100 moves close to an ear. As a motion sensor, an accelerometer sensor may detect magnitude of acceleration in various directions (usually three axes), may detect magnitude and the direction of gravity when stationary, may be configured to identify electronic device postures (such as switching between a landscape mode and a portrait mode, related games, and magnetometer posture calibration), may perform functions related to vibration identification (such as a pedometer and a knock), and the like. The sensor 1105 may further include a fingerprint sensor, a pressure sensor, an iris sensor, a molecular sensor, a gyroscope, a barometer, a hygrometer, a thermometer, an infrared sensor, or the like. Details are not described herein again.

The display unit 1106 is configured to display information entered by the user or information provided for the user. The display unit 1106 may include a display panel 11061, and the display panel 11061 may be configured in a form of a Liquid Crystal Display (LCD), an Organic Light-Emitting Diode (OLED), or the like.

The user input unit 1107 may be configured to receive entered number or character information, and generate key signal input related to user settings and function control of the electronic device. Specifically, the user input unit 1107 includes a touch panel 11071 and another input device 11072. The touch panel 11071 is also referred to as a touchscreen, and may collect a touch operation performed by a user on or near the touch panel (such as an operation performed by a user on the touch panel 11071 or near the touch panel 11071 by using any proper object or accessory, such as a finger or a stylus). The touch panel 11071 may include two parts: a touch detection electronic device and a touch controller. The touch detection electronic device detects a touch position of the user, detects a signal brought by the touch operation, and sends the signal to the touch controller. The touch controller receives touch information from the touch detection electronic device, converts the touch information into touch point coordinates, sends the touch point coordinates to the processor 1110, and receives and executes a command sent by the processor 1110. In addition, the touch panel 11071 may be implemented as a resistive type, a capacitive type, an infrared type, a surface acoustic wave type, or the like. In addition to the touch panel 11071, the user input unit 1107 may further include another input device 11072. Specifically, the another input device 11072 may include but is not limited to: a physical keyboard, a function button (such as a volume control button, a switch button), a trackball, a mouse, and a joystick, which is not described herein.

Further, the touch panel 11071 may cover the display panel 11061. After detecting the touch operation on or near the touch panel 11071, the touch panel 11071 transmits the touch operation to the processor 1110 to determine a type of a touch event, and then the processor 1110 provides corresponding visual output on the display panel 11061 based on the type of the touch event. Although in FIG. 11, the touch panel 11071 and the display panel 11061 are configured as two independent components to implement input and output functions of the electronic device, in some embodiments, the touch panel 11071 and the display panel 11061 may be integrated to implement the input and output functions of the electronic device. Details are not limited herein.

The screen unit 1108 is a screen for connecting an external electronic device with the electronic device 1100. For example, the external electronic device may include a wired or wireless headset port, an external power supply (or a battery charger) port, a wired or wireless data port, a memory card port, a port for connecting an electronic device having an identification module, an audio input/output (I/O) port, a video I/O port, a headset port, and the like. The screen unit 1108 may be configured to receive input (for example, data information and power) from an external electronic device and transmit the received input to one or more elements in the electronic device 1100 or may be configured to transmit data between the electronic device 1100 and an external electronic device.

The memory 1109 may be configured to store a software program and various pieces of data. The memory 1109 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 1109 may include a high-speed random access memory or a nonvolatile memory, for example, at least one disk storage device, a flash memory, or other volatile solid-state storage devices.

The processor 1110 is a control center of the electronic device and connects all parts of the electronic device using various screens and circuits. By running or executing software programs and/or modules stored in the memory 1109 and by calling data stored in the memory 1109, the processor 1110 implements various functions of the electronic device and processes data, thus performing overall monitoring on the electronic device. The processor 1110 may include one or more processing units. An application processor and a modem processor may be integrated into the processor 1110. The application processor mainly processes an operating system, a user screen, an application program, and the like. The modem processor mainly processes wireless communications. It can be understood that the foregoing modem processor may not be integrated into the processor 1110.

The electronic device 1100 may further include the power supply 1111 (such as a battery) supplying power to each component. The power supply 1111 may be logically connected to the processor 1110 by using a power management system, so as to implement functions such as charging management, discharging management and power consumption management by using the power management system.

In addition, the electronic device 1100 includes some functional modules not shown. Details are not described herein again.

An embodiment of the present disclosure further provides an electronic device, including a processor 1110, a memory 1109, and a computer program stored in the memory 1109 and executable on the processor 1110. When the processor 1110 executes the computer program, the foregoing processes of the embodiment of the information processing method are implemented and a same technical effect can be achieved. To avoid repetition, details are not described herein again.

Embodiments of the present disclosure further provide a computer readable storage medium. The computer readable storage medium stores a computer program. The computer program implements, when executed by a processor, the foregoing processes of the embodiment of the information processing method, and a same technical effect can be achieved. To avoid repetition, details are not described herein again. The computer readable storage medium may be a Read-Only Memory (ROM), a Random Access Memory (RAM), a magnetic disk, a compact disc, or the like.

It should be noted that in this specification, the terms "comprise", "include", and any other variants thereof are intended to cover non-exclusive inclusion, so that a process, a method, an article, or an electronic device that includes a series of elements not only includes these very elements, but also includes other elements not expressly listed, or also includes elements inherent to this process, method, article, or electronic device. In the absence of more limitations, an element defined by "including a . . . " does not preclude the existence of other identical elements in the process, method, article, or electronic device that includes the element.

Based on the descriptions of the foregoing implementations, a person skilled in the art may clearly understand that the method in the foregoing embodiments may be implemented by software in addition to a necessary universal hardware platform or by hardware only. In most circumstances, the former is an exemplary implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing an electronic device (which may be a mobile phone, a computer, a server, an air conditioner, a network device, or the like) to perform the methods described in the embodiments of the present disclosure.

The technical features of the above embodiments may be arbitrarily combined. For brevity of description, all possible combinations of the technical features in the above embodiments are not described. However, as long as there is no contradiction between the combinations of these technical features, all these combinations should be considered as the scope of this specification.

The embodiments of the present disclosure are described above with reference to the accompanying drawings, but the present disclosure is not limited to the foregoing specific implementations. The foregoing specific implementations are merely exemplary instead of restrictive. Under enlightenment of the present disclosure, a person of ordinary skill in the art may make many forms without departing from the aims of the present disclosure and the protection scope of claims, all of which fall within the protection scope of the present disclosure.

The invention claimed is:

1. An information processing method, performed by an electronic device, comprising:
   receiving first information inputted by a user in a first input box;
   displaying a second input box in a case that the first information cannot fit in the first input box, wherein the second input box comprises a part or all of the first information;
   receiving second information inputted by the user in the second input box; and
   copying the second information into the first input box.

2. The information processing method according to claim 1, wherein the displaying a second input box in a case that the first information cannot fit in the first input box comprises:
   displaying the second input box in a case that a length of the first information is greater than the first input box, or a type of the first information does not match a first preset input type of the first input box, wherein a length of the second input box is greater than the length of the first input box or a second preset input type of the second input box matches the type of the first information.

3. The information processing method according to claim 1, wherein the receiving second information inputted by the user in the second input box comprises:
   displaying a cursor in the second input box; and
   receiving an editing input performed by the user in the second input box, and editing information in a position of the cursor of the second input box according to the editing input, to obtain the second information.

4. The information processing method according to claim 3, wherein the second input box is displayed on a first screen comprising the first input box; or
   the displaying a second input box comprises:
   displaying an application identifier of at least one text editing application;
   receiving a first input for a target application identifier of the application identifier of the at least one text editing application; and
   in response to the first input, displaying a screen of a target application corresponding to the target application identifier, wherein the screen of the target application comprises the second input box.

5. The information processing method according to claim 3, wherein the displaying a cursor in the second input box comprises:
   moving a cursor in the first input box to the second input box; and
   after the copying the second information into the first input box, the method further comprises:
   displaying the cursor in a first position in the first input box, wherein the cursor is displayed in the first position in the first input box before the cursor in the first input box is moved to the second input box.

6. The information processing method according to claim 4,
   wherein:
   a screen of the target application further comprises a first control and a second control; and
   the copying the second information into the first input box comprises: copying the second information into the first input box in a case that a second input for the first control is received;
   or the method further comprises:
  closing the target application in a case that a third input for the second control is received.

7. An electronic device, comprising: a memory and a processor, wherein the memory stores a computer program, and when executed by the processor, causes the processor to perform an information processing method, the method comprising:
  receiving first information inputted by a user in a first input box;
  displaying a second input box in a case that the first information cannot fit in the first input box, wherein the second input box comprises a part or all of the first information;
  receiving second information inputted by the user in the second input box; and
  copying the second information into the first input box.

8. The electronic device according to claim 7, wherein the displaying a second input box in a case that the first information cannot fit in the first input box comprises:
  displaying the second input box in a case that a length of the first information is greater than a length of the first input box, or a type of the first information does not match a first preset input type of the first input box, wherein a length of the second input box is greater than the length of the first input box or a second preset input type of the second input box matches the type of the first information.

9. The electronic device according to claim 7, wherein the receiving second information inputted by the user in the second input box comprises:
  displaying a cursor in the second input box; and
  receiving an editing input performed by the user in the second input box and editing information in a position of the cursor of the second input box according to the editing input, to obtain the second information.

10. The electronic device according to claim 9, wherein the second input box is displayed on a first screen comprising the first input box; or
  the displaying a second input box comprises:
  displaying an application identifier of at least one text editing application;
  receiving a first input for a target application identifier of the application identifier of the at least one text editing application; and
  in response to the first input, displaying a screen of a target application corresponding to the target application identifier, wherein the screen of the target application comprises the second input box.

11. The electronic device according to claim 9, wherein the displaying a cursor in the second input box comprises:
  moving a cursor in the first input box to the second input box; and
  after the copying the second information into the first input box, the method further comprises:
  displaying the cursor in a first position in the first input box, wherein the cursor is displayed in the first position in the first input box before the cursor in the first input box is moved to the second input box.

12. The electronic device according to claim 10, wherein:
  a screen of the target application further comprises a first control and a second control, and
  the copying the second information into the first input box comprises copying the second information into the first input box in a case that a second input for the first control is received;
  or
the information processing method further comprises:
  closing the target application in a case that a third input for the second control is received.

13. A non-transitory computer-readable storage medium wherein the non-transitory computer-readable storage medium stores a computer program, and when the computer program is executed by the processor, causes the processor to perform an information processing method, the method comprising:
  receiving first information inputted by a user in a first input box;
  displaying a second input box in a case that the first information cannot fit in the first input box, wherein the second input box comprises a part or all of the first information;
  receiving second information inputted by the user in the second input box; and
  copying the second information into the first input box.

14. The non-transitory computer-readable storage medium according to claim 13, wherein the displaying a second input box in a case that the first information cannot fit in the first input box comprises:
  displaying the second input box in a case that a length of the first information is greater than the first input box, or a type of the first information does not match a first preset input type of the first input box, wherein a length of the second input box is greater than the length of the first input box or a second preset input type of the second input box matches the type of the first information.

15. The non-transitory computer-readable storage medium according to claim 13, wherein the receiving second information inputted by the user in the second input box comprises:
  displaying a cursor in the second input box; and
  receiving an editing input performed by the user in the second input box, and editing information in a position of the cursor of the second input box according to the editing input, to obtain the second information.

16. The non-transitory computer-readable storage medium according to claim 15, wherein the second input box is displayed on a first screen comprising the first input box; or
  the displaying a second input box comprises:
  displaying an application identifier of at least one text editing application;
  receiving a first input for a target application identifier of the application identifier of the at least one text editing application; and
  in response to the first input, displaying a screen of a target application corresponding to the target application identifier, wherein the screen of the target application comprises the second input box.

17. The non-transitory computer-readable storage medium according to claim 15, wherein the displaying a cursor in the second input box comprises:
  moving a cursor in the first input box to the second input box; and
  after the copying the second information into the first input box, the information processing method further comprises:
  displaying the cursor in a first position in the first input box, wherein the cursor is displayed in the first position in the first input box before the cursor in the first input box is moved to the second input box.

* * * * *